(12) United States Patent
Khoo (10) Patent No.: US 9,916,598 B2
(45) Date of Patent: Mar. 13, 2018

(54) SYSTEM AND METHOD FOR MANAGING EMAILS

(71) Applicant: Justin Khoo, San Francisco, CA (US)

(72) Inventor: Justin Khoo, San Francisco, CA (US)

(\*) Notice: Subject to any disclaimer, the term of this patent is extended or adjusted under 35 U.S.C. 154(b) by 0 days.

(21) Appl. No.: 14/713,097

(22) Filed: May 15, 2015

(65) Prior Publication Data
US 2015/0264004 A1   Sep. 17, 2015

Related U.S. Application Data

(63) Continuation of application No. 11/581,980, filed on Oct. 17, 2006, now Pat. No. 9,076,147, which is a continuation-in-part of application No. 10/667,103, filed on Sep. 17, 2003, now abandoned.

(60) Provisional application No. 60/411,835, filed on Sep. 18, 2002, provisional application No. 60/422,293, filed on Oct. 30, 2002, provisional application No. 60/457,407, filed on Mar. 25, 2003, provisional application No. 60/478,212, filed on Jun. 12, 2003, provisional application No. 60/480,076, filed on Jun. 20, 2003.

(51) Int. Cl.
| | | |
|---|---|---|
| H04L 12/58 | (2006.01) | |
| H04L 29/06 | (2006.01) | |
| H04W 4/18 | (2009.01) | |
| G06Q 30/02 | (2012.01) | |
| G06Q 10/10 | (2012.01) | |

(52) U.S. Cl.
CPC ....... *G06Q 30/0269* (2013.01); *G06Q 10/107* (2013.01); *G06Q 30/02* (2013.01); *G06Q 30/0251* (2013.01); *G06Q 30/0277* (2013.01); *H04L 51/00* (2013.01); *H04L 51/02* (2013.01); *H04L 51/22* (2013.01); *H04L 51/04* (2013.01)

(58) Field of Classification Search
CPC ....... H04L 12/58; H04L 12/585; H04L 51/36; G06Q 10/107
USPC ........................................................ 709/217
See application file for complete search history.

(56) References Cited

U.S. PATENT DOCUMENTS

| | | | | |
|---|---|---|---|---|
| 5,555,346 A | * | 9/1996 | Gross | G06N 5/022 706/11 |
| 5,809,242 A | * | 9/1998 | Shaw | G06Q 10/107 709/217 |
| 5,832,502 A | * | 11/1998 | Durham | G06F 17/30722 |
| 5,835,084 A | * | 11/1998 | Bailey | G06Q 10/107 715/783 |
| 6,292,825 B1 | * | 9/2001 | Chang | H04L 12/1859 709/206 |
| 2002/0120869 A1 | * | 8/2002 | Engstrom | G06F 21/6209 726/28 |

\* cited by examiner

*Primary Examiner* — Parth Patel
*Assistant Examiner* — Jason Harley
(74) *Attorney, Agent, or Firm* — HIPLegal LLP (57) ABSTRACT

The embodiment of the present invention allows for a simple and intuitive system and method to manage email by applying time-elapsed rules to emails matching specific criteria (i.e. emails coming from specific email addresses): Time-elapsed rules are rules that will execute an action on an email message after the email has been in the inbox for a certain period of time. These actions may include, but are not limited to, moving the email to another folder, copying the email to another folder, and deleting the email.

20 Claims, 11 Drawing Sheets

SYSTEM AND METHOD FOR MANAGING EMAILS

RELATED APPLICATIONS

This application is a continuation of and claims priority from U.S. patent application Ser. No. 11/581,980, entitled "Systems and methods for online marketing and advertising on email systems" filed Oct. 17, 2006, which in turn claims priority to U.S. patent application Ser. No. 10/667,103, entitled "Email method and system" filed on Sep. 17, 2003, U.S. Provisional Application Ser. No. 60/411,835, entitled "Systems and Methods for Online Direct Marketing on Web-Based Email Systems and Websites Over a Network," filed on Sep. 18, 2002, U.S. Provisional Application Ser. No. 60/422,293, entitled "Systems and Methods for Online Direct Marketing and Advertising on Email Systems Over a Network," filed on Oct. 30, 2002, U.S. Provisional Application Ser. No. 60/457,407, entitled "Systems and Methods for Online Marketing and Advertising on Email Systems Over a Network," filed on Mar. 25, 2003, U.S. Provisional Application Ser. No. 60/478,212, entitled "Systems and Methods for the Enhancement of Email Client User Interfaces and Email Message Formats," filed on Jun. 12, 2003, and U.S. Provisional Application Ser. No. 60/480,076, entitled "Systems and Methods for Online Direct Marketing and Advertising on Registration Based Websites and Web-Based Email Systems," filed on Jun. 20, 2003, each of which is incorporated by reference herein in its entirety.

FIELD OF THE INVENTION

The embodiment of the present invention allows for a simple and intuitive system and method to manage email by applying time-elapsed rules to emails matching specific criteria (i.e. emails coming from specific email addresses): Time-elapsed rules are rules that will execute an action on an email message after the email has been in the inbox for a certain period of time. These actions may include, but are not limited to, moving the email to another folder, copying the email to another folder, and deleting the email.

BACKGROUND OF THE INVENTION

Email is one of the most used applications on the Internet. It is touted as a productivity miracle in helping companies and individuals communicate more efficiently than other older means such as telephone, mail and fax. However, as the volume of email increases, the management of email is becoming a burden for most individuals who rely on email to get their work done.

There have been a few ways that have been developed to manage email, such as using filters to sort incoming mail to predefined folders. The problem with this approach is that as the number of folders increase, the burden to the user increases because he now has to check these folders for new email instead of just checking his inbox.

What all the prior art does not solve is the situation wherein the user only wants to use a few folders, preferably a primary one to receive all incoming email, and yet be able to manage their email effectively.

SUMMARY

The embodiment of the present invention allows for a simple and intuitive system and method to manage email by applying time-elapsed rules to emails matching specific criteria (i.e. emails corning from specific email addresses): Time-elapsed rules are rules that will execute an action on an email message after the email has been in the inbox for a certain period of time. These actions may include, but are not limited to, moving the email to another folder, copying the email to another folder and deleting the email. The criteria for the match may include, but are not limited to, user specified email addresses, email domains, subject lines, header information, and the body of the email.

The invention also covers other variations on the "time-elapsed theme," such as instead of just tracking on the amount of time in the inbox, the tracking includes, but is not limited to the amount of time since the email has been created, sent or received.

The gist of the invention is that users are able to easily apply time-elapsed rules to certain email addresses. The benefit of this capability is that after a certain period of time, the emails will move themselves to the appropriate folders to be "archived". Here is a scenario:

The user elects to have all his emails sent to his inbox. Some of the emails are offer emails (offers@macys.com) and newsletters (news@myschool.edu). These emails lose their news-worthy value once the email has been in the inbox for a while. Therefore, the user could elect to apply time-elapsed rules to these emails. For example, all emails from offers@macys.com to be transferred to the "offers" folder after the email is 5 days old. This way, the user does not need to manually move or delete these specific emails.

Another example is emails from friends or work. The user could specify emails from work (i.e. with domain @mywork.com) to be moved to the "work" folder after 2 days, but only if the email has already been read. The final parameter (is read), ensures that important emails are only transferred after they have been read.

Once the user has set up a number of time-elapsed rules, the user's email management tasks will have been vastly simplified. New emails will mostly get delivered to his inbox, and the less-important ones will automatically get deleted or moved after a few days, and the more important emails either stay in the inbox, or get moved after they have been read. This Invention also gives control to the user, because it is the user that decides which emails from which email addresses are important and which are less important—unlike other methods, such as auto-expiry which delete or archive all emails in a specific folder, or sender-based expiry, in which the decision rests on the sender.

Finally, the invention also covers cases where the invention is a plugin to an existing email client such as Microsoft Outlook. The invention also allows for an alternative email listing view interface when used as a plugin, in cases where the email client does not provide for adequate customization of the email listing view interface.

A method for placing preview enhanced messages in registration-based websites comprises: a user node having a browser program coupled to a network, said user node providing requests for information on said network; a promotions server node in operative association with a data repository responsive to a request and deliver promotions to said user node where the promotions server node contains profile information about said user and is able to send targeted promotions to said user, where the promotion listing contains a mechanism to dynamically display and hide graphical elements that serve as a teaser to the promotions on top of the aggregate listing of promotions, where the mechanism is an icon, wherein the promotion listing is in a separate folder than the listing of the user's email (i.e.

inbox), wherein the promotion listing is in the same page as the listing of the user's email (i.e. inbox).

BRIEF DESCRIPTION OF THE DRAWINGS

FIG. 1 a-F illustrates an embodiment of the present invention of an e-mail client with messages in the user's Inbox. Also shown is a button to launch the time-elapsed rule management application.

FIG. 1 b-F illustrates an embodiment of the present invention of an e-mail client with messages in the user's inbox where the user has right-clicked on an e-mail entry and a menu is shown displaying time-elapsed options for the user to select.

FIG. 2a-F through 2c-F illustrates an embodiment of the present invention of the time-elapsed rule management interface.

FIG. 3-F Illustrates an embodiment of the present invention of an e-mail client with messages in the user's inbox where visual features identifying e-mails entries that match certain criteria of the time-elapsed rule are shown.

FIG. 4-F is a block diagram illustrating an embodiment of the present invention.

FIG. 5-F is a flow diagram of a routine for the creation of a time-elapsed rule

FIG. 6-F is a flow diagram of a routine which processes new messages for emails that match existing time elapsed rules.

FIG. 7-F is a flow diagram of a routine which scan messages in an email datastore to identify messages that are ready to be actioned upon.

FIG. 8-F Is a flow diagram of a routine, which generates the view of e-mails within a folder.

DETAILED SPECIFICATION

The embodiment of the present invention allows for a simple and intuitive system and method to manage email by applying time-elapsed rules to emails matching specific criteria (i.e. emails coming from specific email addresses). Time-elapsed rules are rules that will execute an action on an email message after the email has been in the inbox for a certain period of time. These actions may include but not limited to, moving the email to another folder, copying the email to another folder and deleting the email. The criteria for the match may include but not limited to, user specified email addresses, email domains, subject lines, header information and the body of the email.

The Invention also covers other variations on the "time-elapsed theme". Such as instead of just tracking on the amount of time in the Inbox, the tracking includes but is not limited to the amount of time since the email has been created, sent or received.

The gist of the invention is that users are able easily apply time-elapsed rules to certain email addresses. The benefit of this capability is that after a certain period of time, the emails is will move themselves to the appropriate folders.

In one embodiment, the system tracks the user's request to create a time-elapsed rule, by adding the rule to a time-elapsed rule list. The time-elapsed rule consists of, one or more message matching criteria (i.e. from: email address), time-elapsed duration (i.e. 5 days), action to be taken after such duration (i.e. move to some folder) and optionally, other parameters which need to be satisfied before such action takes place (i.e. message needs to be read first). Whenever new messages are received, the system checks for messages that match the criteria in its time-elapsed rule list.

The message identifier (ID) of matching messages are added to a Message ID list, which the system will use to flag messages that match time-elapsed rules, but are not yet actioned upon. During specific intervals, or when the email application is launched, or other related events, the system may perform an email scan to identify messages with message IDs that are in the Message ID list, where the time-elapsed rule is due and any optional parameters are met. The system will then take the action specified in the time-elapsed rule that applies to this message and then remove this message's message ID from the message ID list. A message ID in this invention refers to any method by which the email system or application uniquely identifies this message, a preferred method in the invention uses Integer identifiers that are incremented for each new message in the system.

In one embodiment, a view of a folder listing messages in it will mark messages for which the message ID is listed in the message ID list with a visual cue to the user to let the user know that the message matches a time-elapsed criteria and action will be taken on that message when the time-elapsed criteria and parameters are met.

FIG. 1a-F illustrates an embodiment of the present invention of an email client with messages in the user's inbox. Also shown is a button to launch the time-elapsed rule management application. This example email client 101 contains a window showing a plurality of email folders such as the inbox folder 103' and a plurality of user-created folders 104. This example email client 101 also contains a window 106 displaying a list of messages in the active or selected folder 103. Within this window 106 are a list of messages 102. Also, in this embodiment, a button 105 is placed on the email client for the user to create and manage time-elapsed rules. Other embodiments familiar to those skilled in the art for the user to create and manage time-elapsed rules can be used, such as menus in the toolbar.

FIG. 1b-F illustrates an embodiment of the present invention of an email client with messages in the user's inbox where the user has right clicked on an email entry and a menu is shown displaying time-elapsed options for the user to select. In this illustration of an example of an email client 111, the user has "right clicked" 113 on an email entry 112, causing a pop-up menu 114 to appear. Within that menu are a plurality of actions the user can perform to the email message. In the preferred embodiment a plurality of time-elapsed management actions are placed on the menu 115. The actions include the ability to set or create new time-elapsed rules, to unset or delete time-elapsed rules in cases where the message already has time-elapsed rules associated with it, and to create and or assign messages to specific time-elapsed rule categories. Other methods familiar to those skilled in the art other than right clicking may be used, such as in the case of Apple computers where there is no right-click button.

FIGS. 2a-F through 2c-F illustrate an embodiment of the present invention of time-elapsed rules management windows. FIG. 2a-F. illustrates an example of a time-elapsed rules management window that is shown to the user after the user has selected an action to create or manage time-elapsed rules, such as clicking on the time-elapsed management button 105 in FIG. 1a-F, or selected one of the time-elapsed management actions 115 (Set Time-elapsed Rule) on the pop-up menu 114 in FIG. 1b-F.

In an embodiment of the invention, there are two types of time-elapsed rules that can be created: Simple and Advanced 202. In the Simple method, the user only needs to define four basic criteria: The email address that this rule applies to 203, the folder that the email will be moved to after the predefined time has elapsed 204, the time-elapsed length 205 and an option to only move the message after the message has been read or marked read 206. Other permutations and criteria may be added, but the basic premise is that the rules apply to messages matching a specific criteria present in the message, a predefine time-elapsed (which may Include but not limited to the time after the message has arrived, created, sent), the action to take at or after such time and any other pre-conditions that need to be met before such action is taken.

FIG. 2b-F illustrates an example of FIG. 2a-F where more options are given to the advanced user. The user is given an option to either move, delete, or copy 212 messages with criteria 213 which may match fields such as the sender's email address, email subject line, body, and even the account that the email has been retrieved from (i.e. AOL, Juno, Earthlink).

In FIG. 2a-F, an option is given to the user to create a new time-elapsed rule category, as shown in FIG. 2c-F. A time-elapsed rule category, is like a time-elapsed rule whereby the message matching criteria is not pre-set, but the other variables such as the time-elapsed period 224, action 222, and parameters 225 are set. The time-elapsed rule category is assigned a name 222. When a user assigns the category to a specific email, the system automatically associates email messages from the sender of that email to the time-elapsed rule specified in the time-elapsed rule category.

Figure 3:
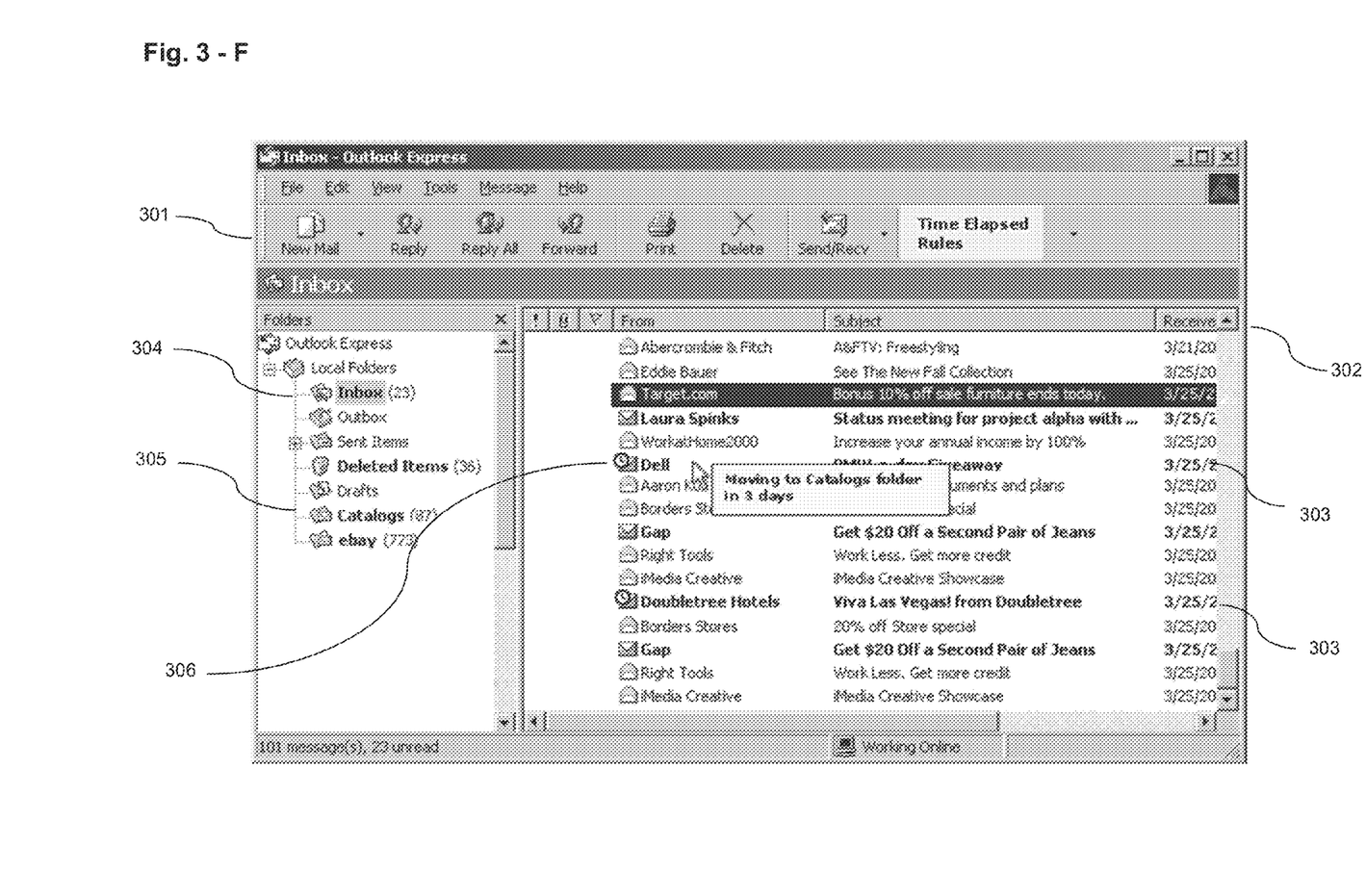

FIG. 3-F illustrates an embodiment of the present invention of an email client 301 with messages in the user's inbox 302 where certain messages that match time-elapse rules and are in the Message ID list are shown with visual identifying cues (icons) 303. In this embodiment, when the user moves the mouse pointer above the email entry which match a time-elapse rule, a small "tool tip" message will appear notifying the user the actions that will be taken and by when (for example "This message will be moved to the Catalogs folder In 3 days"). In the shown example, the message under the mouse pointer 306 will be automatically moved from the inbox folder 304 to the Catalogs folder 305 in 3 days.

Figure 4:
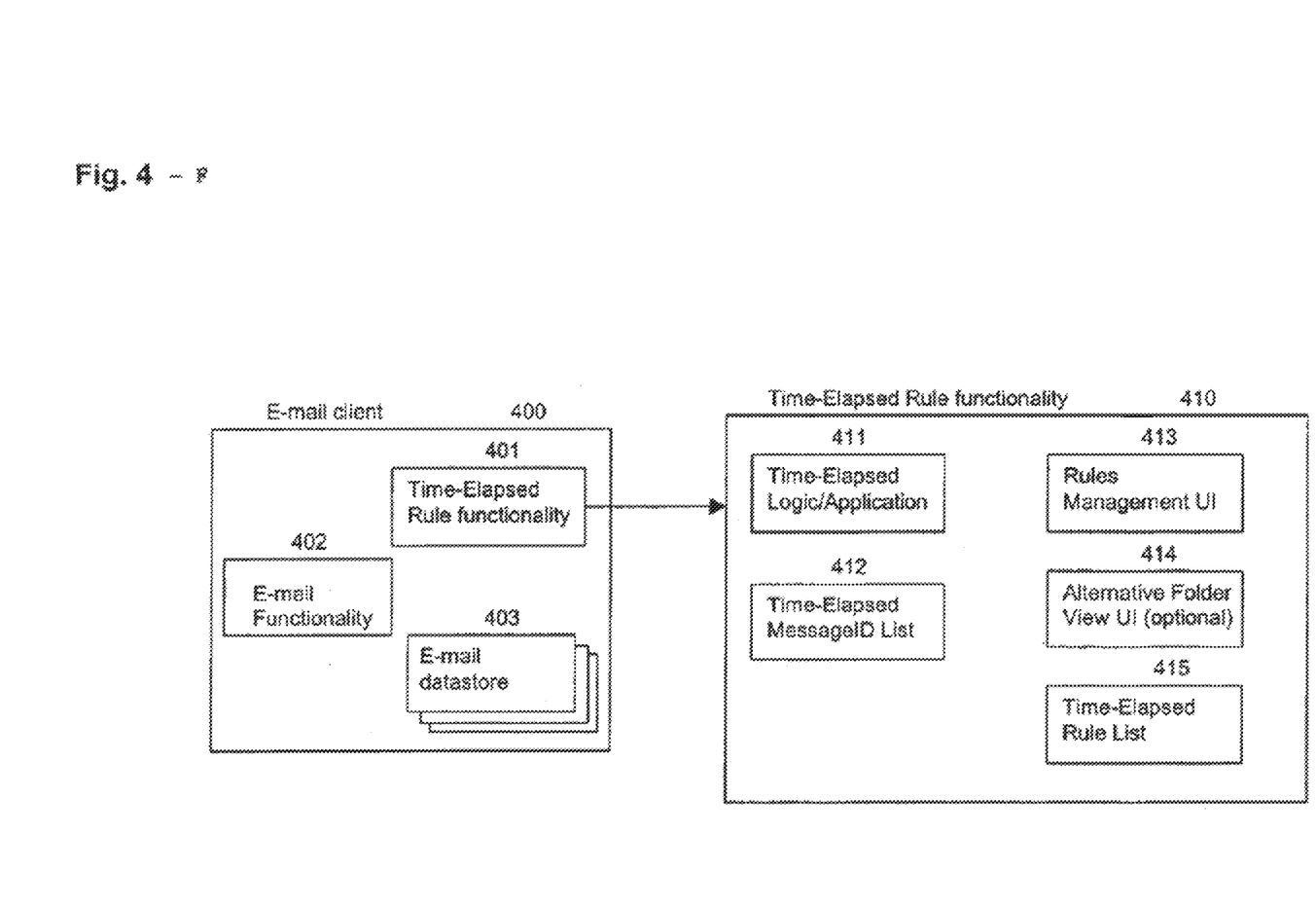

FIG. 4-F is a block diagram illustrating an embodiment of the present invention. This embodiment is where the time-elapsed rules system 401 is integrated into the email client application 402. The email client also contains an application that performs standard email routines 402, such as retrieving, sending, composing email messages and one or more email datastores 403 which contain the user's emails. In other embodiments the email datastore may be located elsewhere such as on a server over a network. 410 is a detailed diagram showing the components of the time-elapsed rules system 401. The time-elapsed rule system includes a time-elapsed rule application and logic 411 which performs most of the routines of the application, a rules management user interface 413 which allow users to set up and manage time-elapsed rules, a time-elapsed rule list 415 which keeps track of the rules that are created, and a time-elapsed message 'ID list (Message ID list) 412, which keeps track of messages in the email datastore 403 that match one or more of the time-elapsed rules in the time-elapsed rule list but have yet to be actioned upon and optionally an alternative folder view user-interface 414. The alternative folder view user interface particularly applies for cases where the time-elapsed system is not directly integrated into the email client, but through other means, such as a plugin or application programming interface. The alternative folder view UI will be covered in detail in the section: "INTEGRATION WITH EXISTING EMAIL APPLICATIONS."

Figure 5:
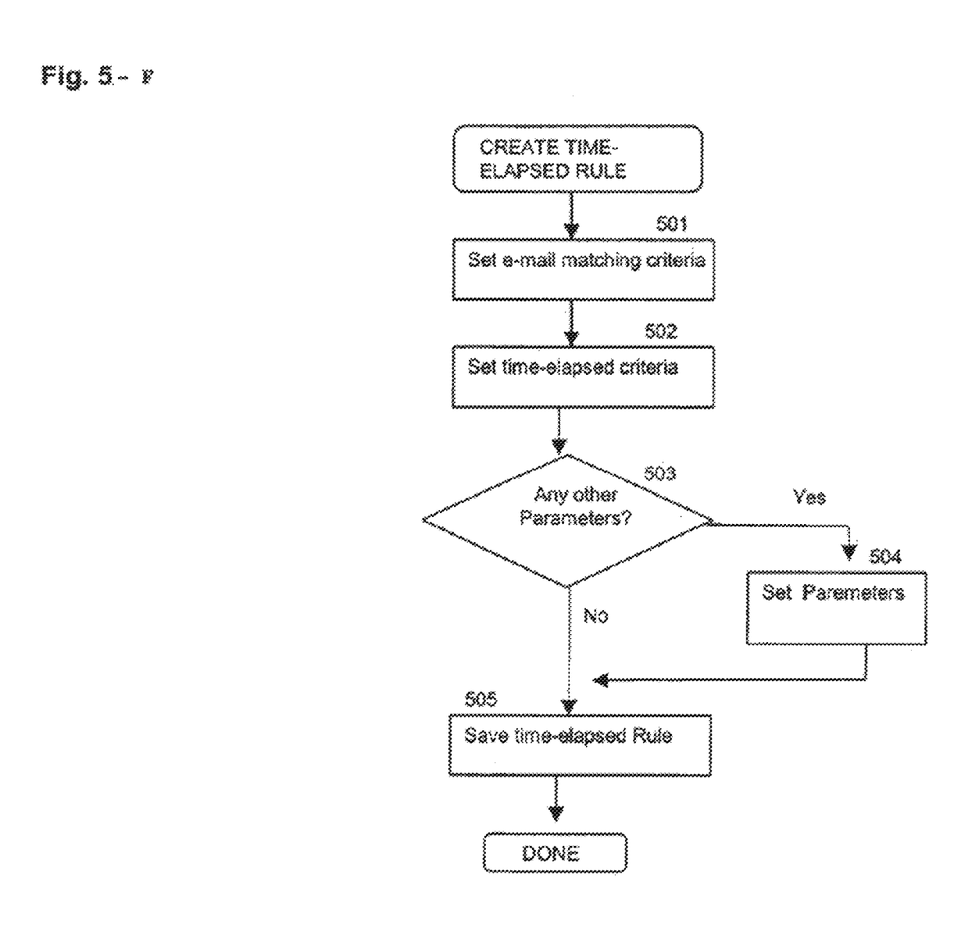

FIG. 5-F is a flow diagram of a routine for the creation of a time-elapsed rule. To create a time-elapsed rule, a user would have to specify certain parameters which are then fed into the routine. In step 501, the system retrieves the message matching criteria (i.e. sender's email address). In step 502, the system retrieves the time-elapsed criteria. In step 503, the system checks if there are any other parameters or pre-conditions that the user specified that need to be met before a time-elapsed rule is to be executed on an email message. If parameters or pre-conditions exist, the system continues at step 504, else the system continues at step 505. In step 504 the system retrieves the parameters set by the user. In step 505, a new time-elapsed rule is created and added to the Time-Elapsed rule list. A variation of this routine may be used to perform updates to existing time-elapsed rules.

FIG. 6-F is a flow diagram of a routine which processes new messages for emails that match existing time-elapsed rules. New messages may be retrieved by the email client either in a predefined interval or by the user's action. The purpose of this routine is to identify incoming messages that match existing time-elapsed rules. When the time-elapsed rules system is enabled in an email client, each incoming message is checked (step 601) against the time-elapsed rules in the time-elapsed rules list. On step 602, if the message matches the criteria of one of the time-elapsed rules, step 603 is taken by the system, else nothing is done and control passes back to the routine retrieving the email messages. In step 603, a new entry is created in the Message ID list that maps the email's message ID with the time-elapsed rule that applies to this specific email.

Figure 7:
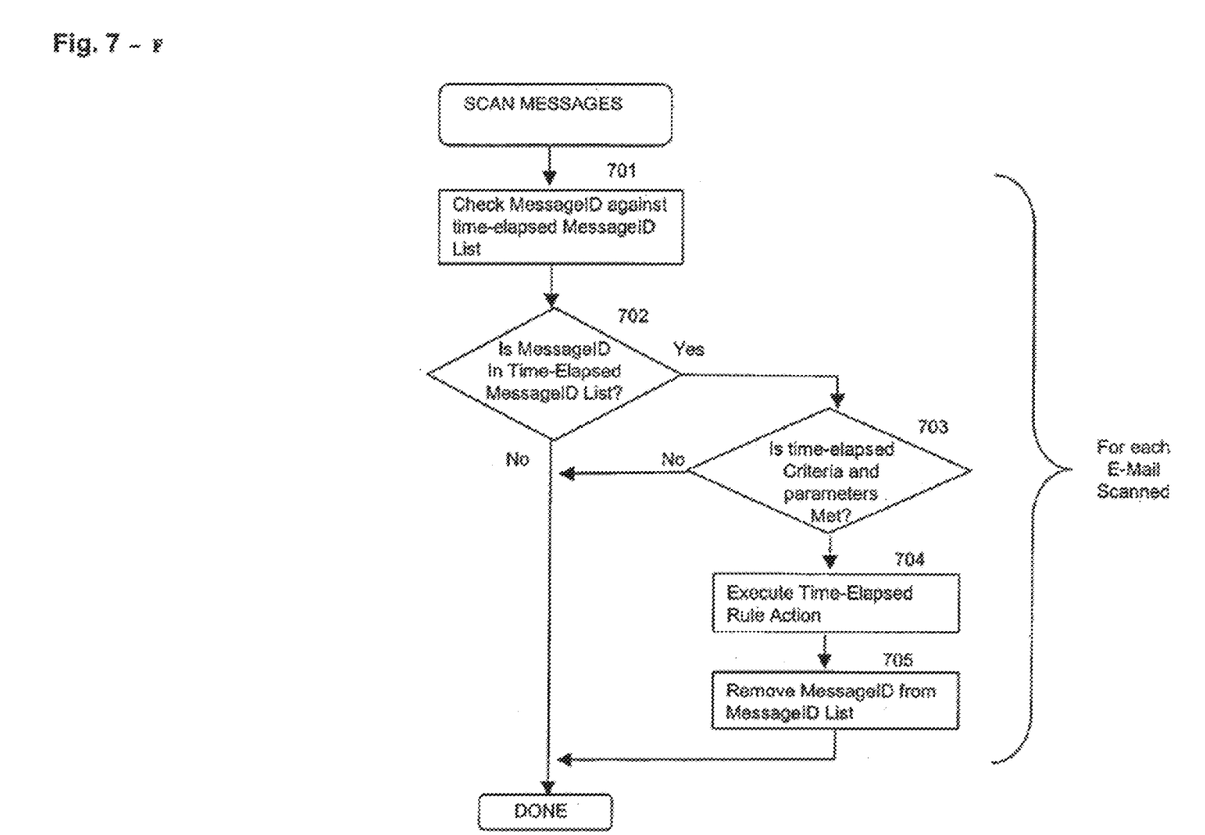

FIG. 7-F is a flow diagram of a routine which scan messages in an email datastore to identify messages that are ready to be actioned upon. This scan can take place at a plurality of events, such as when the application is started, when new emails are retrieved, at specific time periods, by a user action. In the specific embodiment of the invention, the scan takes place when the user launches the email application and when the user changes the active folder. A more limited scan may take place when the user changes the active folder, such as only scanning messages in the active folder. Each message in the folder (or datastore depending on the scope of the scan) is checked against the time-elapsed Message ID list (Step 701). In Step 702, if the message ID of the email exists in the time-elapsed Message ID list, then step 703 is performed, else nothing else is performed for that message. In step 703, the time-elapsed rule mapped to the email's message ID is retrieved from the time-elapsed rule list and the message is checked to see if all the criteria, preconditions and parameters are met (i.e. the time-elapsed time has elapsed for that message and the message has been read). If the criteria, preconditions and parameters are met, then step 704 is taken by the system, else nothing else is done to the message. In step 704, the specified action in the time elapsed rule that is mapped to this message is performed (i.e. moving the message to another folder). In step 705, the message ID of this message is removed from the time-elapsed Message ID list.

Figure 8:
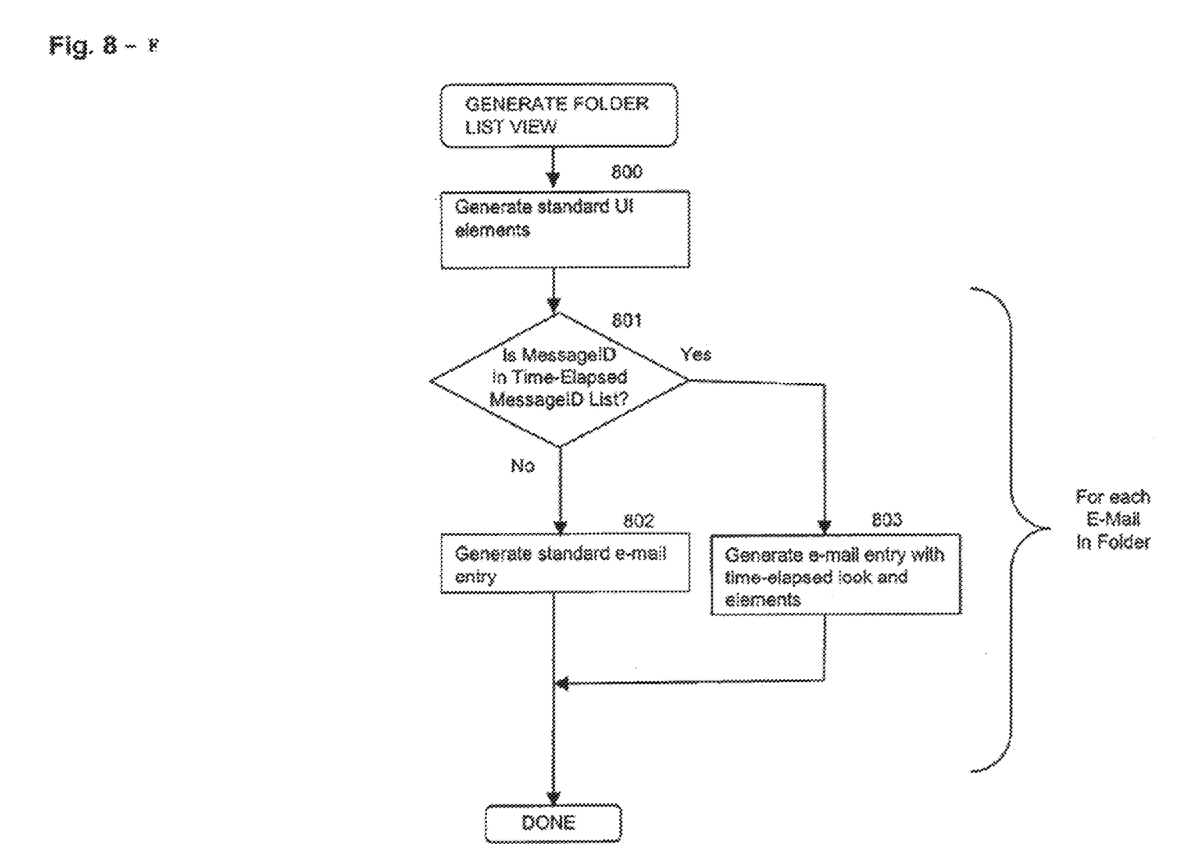

FIG. 8-F. is a flow diagram of a routine which generates the view of emails within a folder. This routine demonstrates the adding of visual cues and elements to email entries (FIG. 3-F) that match time-elapsed rules, to help the user to identify these messages. In step 800, the standard user-interface elements are generated, such as the window and column headers. Each message's Message ID in the folder is checked against the message ID in the time-elapsed Message ID list and if there is a match, step 803 is taken by the system, else step 802 is taken. In step 803 the email entry is generated with visual elements such as a different icon with a timer to indicate that this is message matches certain time-elapsed rules and tool-tip elements which, when the user mouses over the entry, will display a summary of the time-elapsed rule that applies to this message. In step 802, the email entry is generated with standard look and feel elements.

Integration with Existing Email Applications:

The embodiment of the invention discussed in the previous section does not differentiate between whether the time-elapsed rule system is directly integrated into the email client or is integrated via an external architecture such as a plugin, application programming interface (API) or some other methods familiar to those skilled in the art.

The preceding discussion would be adequate for those skilled in the art to directly integrate the time-elapse function into an email client. However, in cases where a plugin or API is used the process might not be so straightforward— it is the aim of this discussion to address integrating with an existing email client via an architecture such as a plugin or API.

Figure 1A:
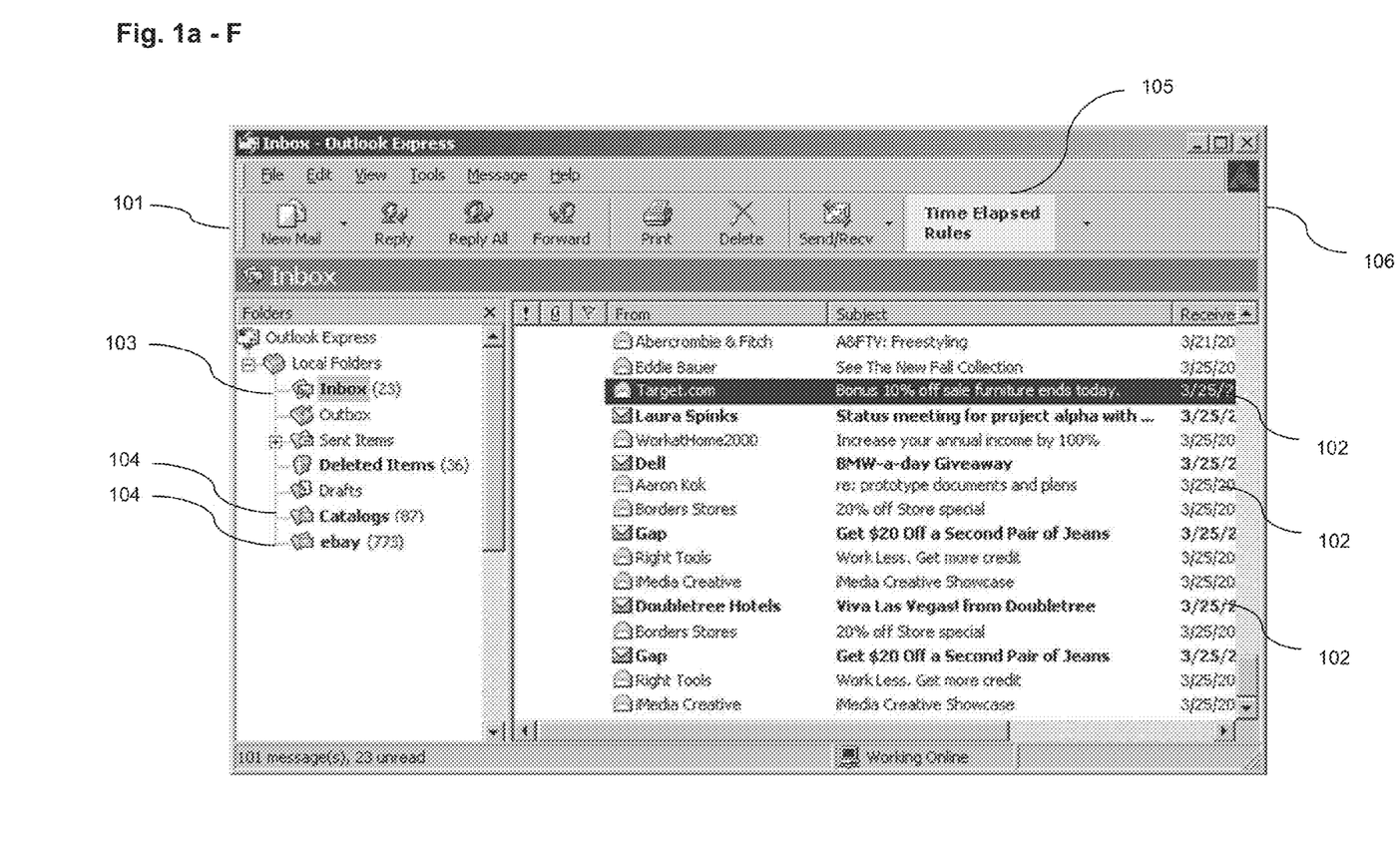
Figure 1B:
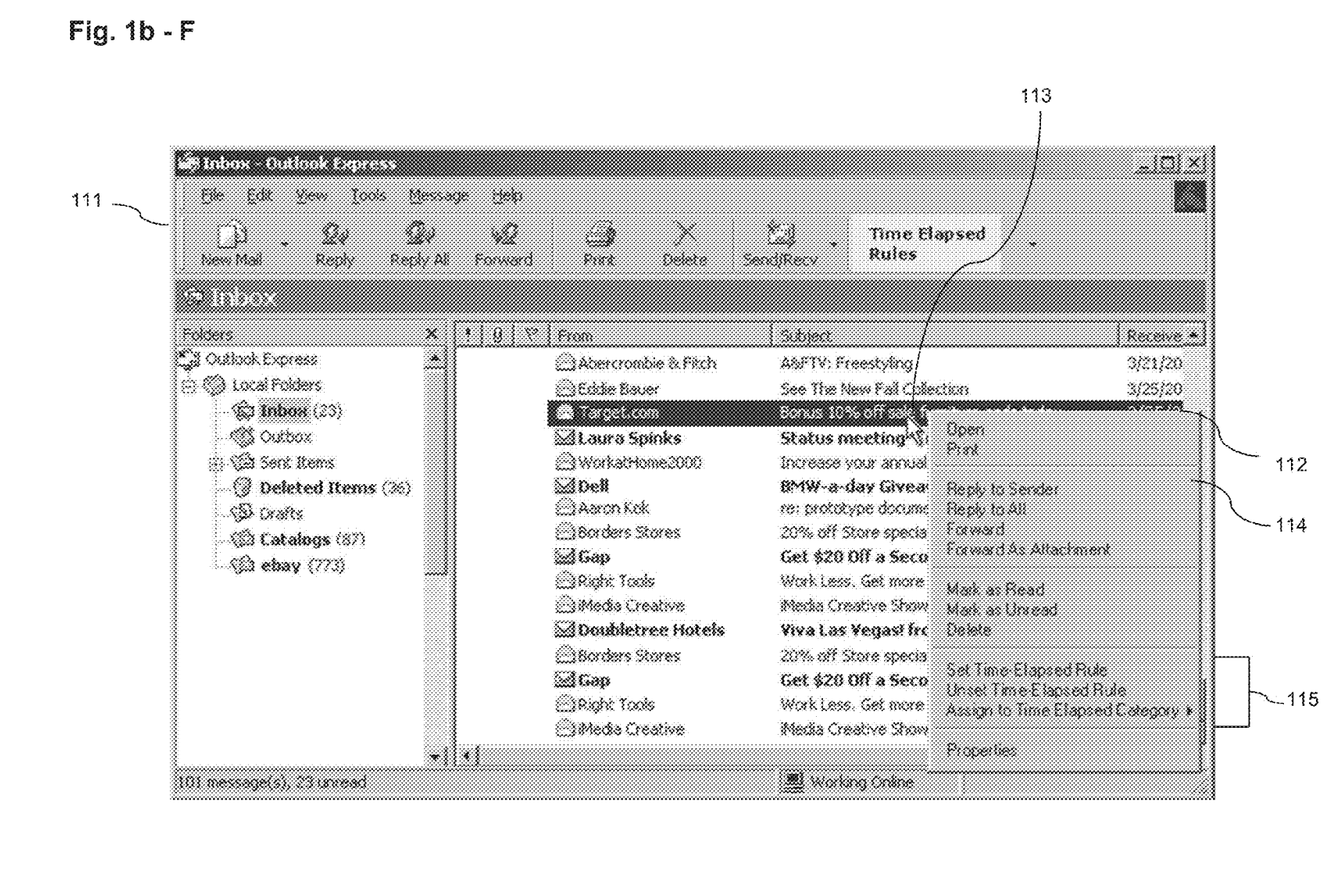
Figure 2A:
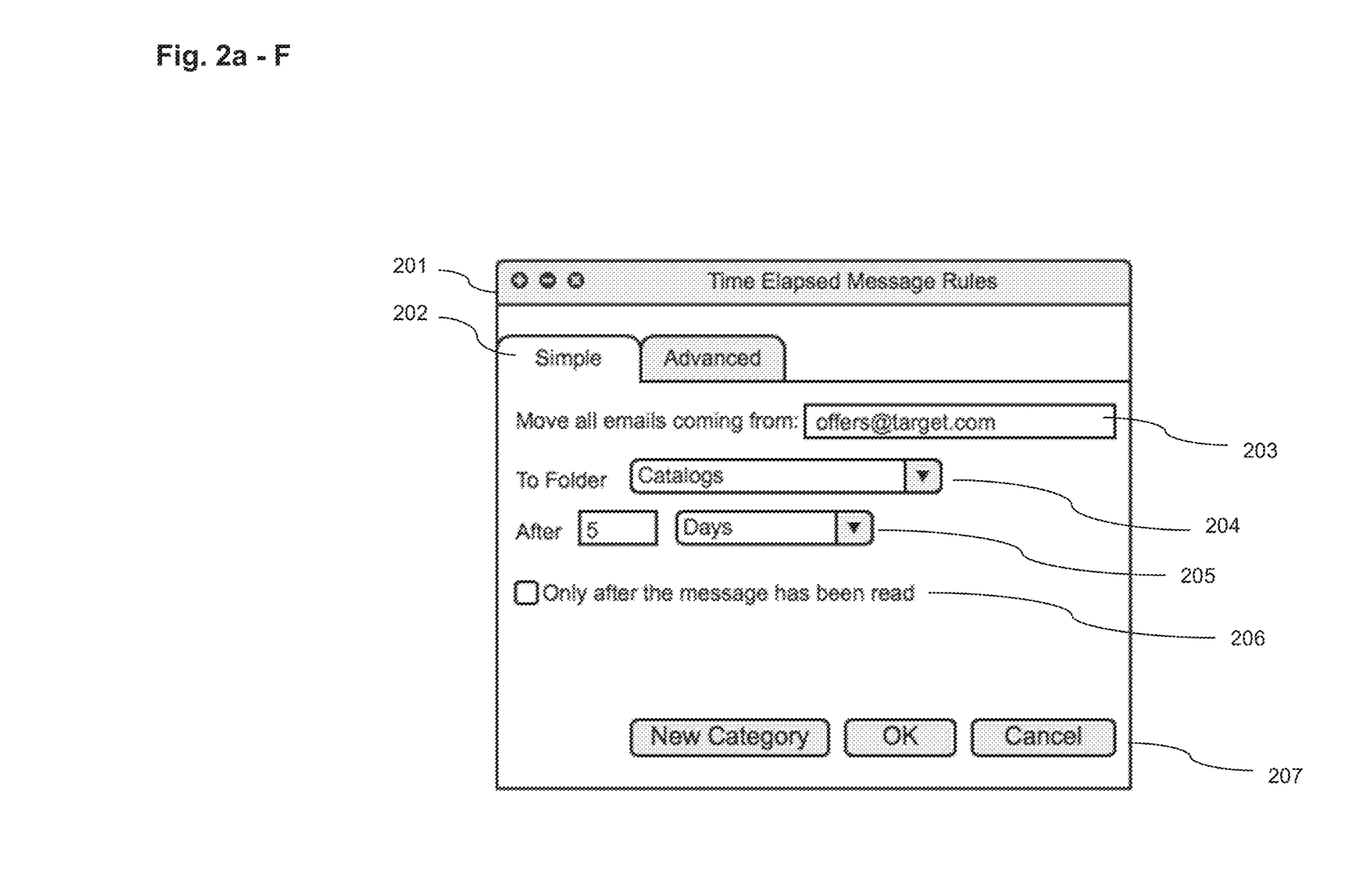
Figure 2B:
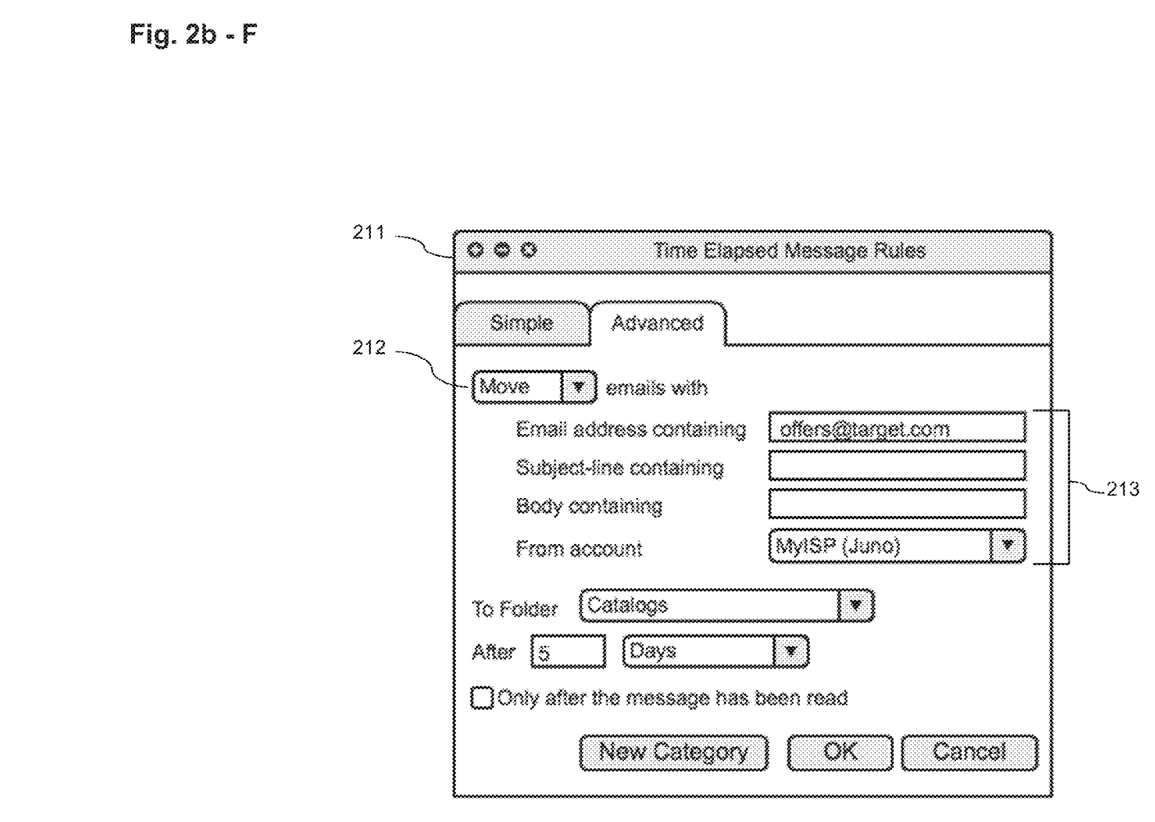
Figure 2C:
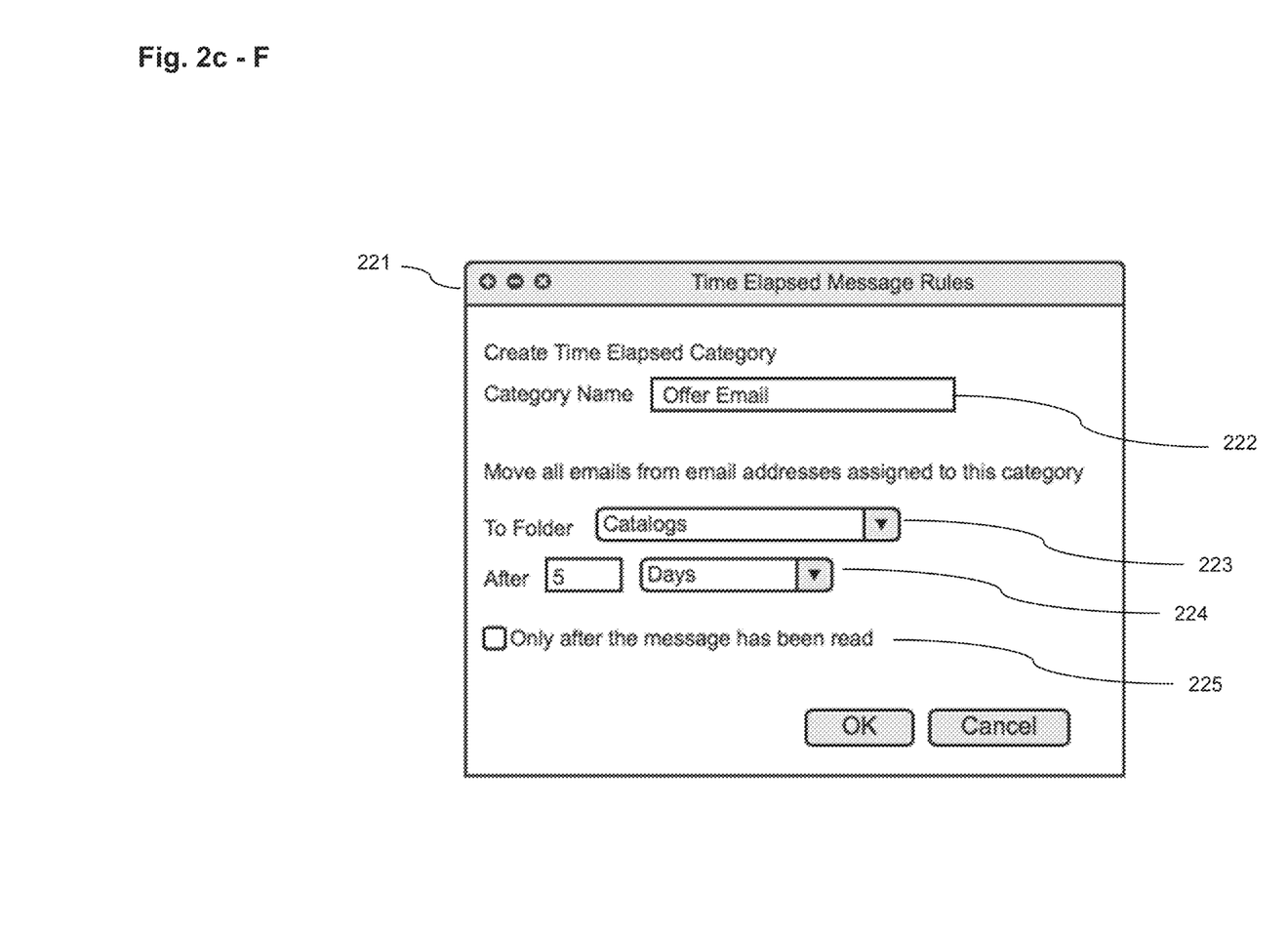

Microsoft Outlook is an email client that provides numerous avenues to customize and enhance its function. These functions include ActiveX, Outlook Object Model (OOM), Collaborative Data Objects (CDO) and Component Object Model (COM). While it is straightforward to implement the most of the time-elapsed functionality via OOM, CDO or COM, certain aspects of the invention may be more difficult to implement this way, such as the enhanced drop-down menu (114 in FIG. 1*b*-F) and the enhanced "tool tips" and icons shown in FIG. 3-F. It is not the aim of this discussion to limit the ways to perform the before mentioned customizations that this invention applies to, but merely to suggest simpler means to achieve them. One of the approaches to solve this problem is to develop a completely new user-interface on top of Microsoft Outlook (a path taken by the Nelson Email Organizer), whereby a button such as 105 (in FIG. 1*a*-F) is added to Outlook's toolbar that launches the new interface with all the enhanced functions. The new interface will communicate with Outlook via one of the before mentioned avenues ActiveX, OOM, CDO or COM.

However, Microsoft Outlook in particular also gives the ability to the user to create folders which display HTML pages (the page points to a URL). It is an object of this invention to allow for the integration of a new user-interface directly into the user-interface of the email client (Outlook). In one embodiment of the invention that uses this approach, the "folder view" (112 in FIG. 1*b*-F and 202 in FIG. 3-F) of messages, is generated by an ActiveX object embedded in an HTML page. This ActiveX object communicates with Outlook via COM and OOM and retrieves such messages and renders them for the user. Since this user interface is in fact and "Alternative UI" 414 (in FIG. 4-F). The user-interface is fully customizable because it is not restricted to the customization options of Outlook's existing "folder view". Other methods familiar to those skilled in the art may be used.

The invention claimed is:

1. A computer implemented method of managing electronic messages, the method comprising the steps of:
    detecting receipt of a first message, received over a communications network, from a first sender for an account of a recipient;
    executing, via a processor, an instruction based on a rule to delete the first message upon elapse of a first defined time period, wherein the elapse of the first defined time period becomes satisfied at a future time;
    wherein the rule is created by the recipient and identifies the first sender and the first defined time period;
    wherein the rule is set, before the executing of the instruction, by the recipient using a recipient interface;
    wherein creation of the rule comprises the recipient selecting at least one message in a plurality of messages displayed in the recipient interface and selecting at least one menu option that triggers the recipient interface to display (1) a window containing the first sender of the at least one message, (2) an option to set the first defined time period for the first sender, and (3) a confirmation control;
    wherein the rule created by the recipient identifies the first sender and the first defined time period;
    wherein when the first defined time period is set by information received from the recipient based at least in part on information of the first sender and the control is actioned by the recipient, and the first defined time period is different from a second event set by the recipient for a second message from a second sender;
    wherein the messages having the applied rules are displayed within the recipient interface after receipt and will no longer be displayed in the recipient interface after the first defined time period;
    wherein the first defined time period is measured from receipt of the first message; and
    wherein the first message is an email and the first sender is identified by an email address.

2. The method of claim 1 wherein an action of moving the first message to another location is performed.

3. The method of claim 2 wherein at least one additional condition set by the user is satisfied before performing the action.

4. The method of claim 3 wherein the additional condition relates to the first message being marked as read.

5. The method of claim 3 further comprising the step of displaying an identifier associated with the first message within a list of messages, the identifier indicating that the action is scheduled to be performed at a future time based on satisfying the at least one condition.

6. The method of claim 5 wherein the identifier visually indicates the at least one condition and/or the action.

7. A computer implemented method of managing electronic messages, the method comprising the steps of:
    detecting receipt of a first message, received over a communications network, from a first sender for a user account;
    executing, via a processor, an instruction based on a rule to delete the first message upon elapse of a first defined time period associated with the first sender in the rule;
    wherein the elapse of the first defined time period becomes satisfied at a future time;
    wherein the rule is created upon receipt from a user of a request to create the rule and the rule comprises an identity of the first sender and the defined time period;
    wherein the first defined time period is different from a second defined time period for a second message from a second sender to the recipient;
    wherein, upon the selection by the recipient of at least one message in a plurality of messages and at least one option, the user interface is triggered to display to the user both the identity of the first sender of the at least one message and at least an option to set the first defined time period, which is to be associated with the sender;

wherein the rule is added to a rule list;

wherein the first defined time period is measured from receipt of the first message, and wherein the first message is an email and the first sender is identified by an email address.

8. A computer implemented method of managing electronic messages, the method comprising the steps of:

detecting receipt of a first message, received over a communications network, from a first sender for a user account;

displaying to the user, in a user interface, a plurality of messages including the first message from the first sender;

receiving, from the user, a selection of the first message from the plurality of messages displayed in the user interface;

displaying, to the user, a window comprising an identification of the first sender and an option to set a first defined time period;

wherein the first defined time period is different from a second defined time period for a second message from a second sender to the recipient;

receiving, from the user, a selection of the first defined time period, wherein the first defined time period identifies the duration that will elapse between receipt and deletion of a third message received from the first sender;

generating a rule for the user account, wherein the rule comprises the identification of the first sender and the first defined time period associated with deletion of the third message received from the sender;

providing a deletion indicator in a message list view of the user interface for messages marked for deletion;

activating the deletion indicator for messages marked for deletion, wherein said activation effects display of deletion criterion associated with said messages marked for deletion;

executing, via a processor, an instruction based on the rule to delete the third message upon elapse of the first defined time period, wherein the elapse of the first defined time period becomes satisfied at a future time;

wherein the first defined time period is measured from receipt of the first message, and wherein the first message is an email and the first sender is identified by an email address.

9. The method of claim 1, wherein the second event is a second defined time period.

10. The method of claim 7 wherein an action of moving the first message to another location is performed.

11. The method of claim 7 wherein the first message is an email and the first sender is identified by an email address.

12. The method of claim 10 wherein at least one additional condition set by the user is satisfied before performing the action.

13. The method of claim 12 wherein the additional condition relates to the first message being marked as read.

14. The method of claim 12 further comprising the step of displaying an identifier associated with the first message within a list of messages, the identifier indicating that the action is scheduled to be performed at a future time based on satisfying the at least one condition.

15. The method of claim 14 wherein the identifier visually indicates the at least one condition and/or the action.

16. The method of claim 8 wherein an action of moving the first message to another location is performed.

17. The method of claim 8 wherein the first message is an email and the first sender is identified by an email address.

18. The method of claim 17 wherein at least one additional condition set by the user is satisfied before performing the action.

19. The method of claim 18 wherein the additional condition relates to the first message being marked as read.

20. The method of claim 18 further comprising the step of displaying an identifier associated with the first message within a list of messages, the identifier indicating that the action is scheduled to be performed at a future time based on satisfying the at least one condition, wherein the identifier visually indicates the at least one condition and/or the action.

* * * * *